United States Patent
Lin et al.

(10) Patent No.: US 8,040,424 B2
(45) Date of Patent: Oct. 18, 2011

(54) MOBILE COMMUNICATION DEVICE WITH CAMERA MODE AND MOBILE COMMUNICATION MODE AND OPERATION METHOD THEREOF

(75) Inventors: Chih-Shen Lin, Hsinchu (TW); Te-Yu Kao, Hsinchu (TW); Young-Fei Chien, Hsinchu (TW)

(73) Assignee: Altek Corporation, Hsinchu (TW)

( * ) Notice: Subject to any disclaimer, the term of this patent is extended or adjusted under 35 U.S.C. 154(b) by 1222 days.

(21) Appl. No.: 11/367,477

(22) Filed: Mar. 6, 2006

(65) Prior Publication Data

US 2007/0146525 A1      Jun. 28, 2007

(30) Foreign Application Priority Data

Dec. 27, 2005   (TW) .................. 94146812 A

(51) Int. Cl.
  *G02B 13/16*   (2006.01)
  *H04N 5/225*   (2006.01)
  *H04M 1/00*    (2006.01)
  *H04B 1/38*    (2006.01)

(52) U.S. Cl. ................ 348/335; 455/556.1; 455/557

(58) Field of Classification Search ............ 348/335
  See application file for complete search history.

(56) References Cited

U.S. PATENT DOCUMENTS

| | | | |
|---|---|---|---|
| 6,518,993 B2 * | 2/2003 | Kerai et al. | 348/14.01 |
| 6,526,287 B1 * | 2/2003 | Lee | 455/556.1 |
| 7,196,718 B1 * | 3/2007 | Barbeau et al. | 348/14.02 |
| 2004/0027474 A1 * | 2/2004 | Aoyama et al. | 348/335 |
| 2004/0259590 A1 * | 12/2004 | Middleton | 455/556.1 |
| 2005/0083418 A1 * | 4/2005 | Sasaki | 348/231.99 |
| 2005/0152197 A1 * | 7/2005 | Cho et al. | 365/221 |

* cited by examiner

*Primary Examiner* — Lin Ye
*Assistant Examiner* — Chia-Wei A Chen
(74) *Attorney, Agent, or Firm* — Rosenberg, Klein & Lee

(57) ABSTRACT

A mobile communication device with camera comprises a mobile communication module, a camera module, a storage unit, a display unit, and a switching module. The mobile communication module has a first transmission interface, the camera module has a second transmission interface; image data processed that are outputted by means of the camera module via the second transmission interface, and next the image data outputted that are received by the mobile communication module via the first transmission interface, and next the image data received that are transmitted to the storage unit to be stored and to the display unit to be displayed. The switching module is installed in the mobile communication module for switching to the camera module operation or the mobile communication module operation.

20 Claims, 4 Drawing Sheets

MOBILE COMMUNICATION DEVICE WITH CAMERA MODE AND MOBILE COMMUNICATION MODE AND OPERATION METHOD THEREOF

BACKGROUND OF THE INVENTION

1. Field of the Invention

The present invention relates to a mobile communication device with camera, and more particularly to signal processing of the mobile communication device with camera and operation method thereof.

2. Description of the Prior Art

Integration of the camera and the mobile communication device (such as the mobile phone) has become the trend that users not only use the communication function of the mobile communication device but also use the photographing function of the camera. That an image sensor is disposed at the mobile communication device, and the image acquired that are processed by a processor; and next, the image data processed that are transmitted to the displayer to be displayed or to the storage device to be stored. Reference is made to FIG. 1 which is a schematic view of a mobile phone with camera of the prior art. The mobile phone housing 10 has an image sensor 11 for acquiring images to integrate the communication function and the photographing function.

Reference is made to FIG. 2 which is a perspective schematic view of a communication device with removable camera of the prior art, T.W. Pat. No. M256034 (Jan. 21, 2005). It discloses that a removable camera module 20 is used to acquire images by means of a camera lens 22 and a image sensor 23, and next, the image data are transmitted to a communication device 19 to be processed by means of connection unit 25 and connection unit 16 when the removable camera module 20 is contained in a containing groove 17. That's to improve the drawback of the specification of the fixed camera module and provide a good flexibility for using.

However, the existing camera module has only the function of acquiring images, and the image data acquired are transmitted to be processed by means of a circuit or a processor; and next the image data processed that are transmitted to be displayed and stored. Hence, the original image data acquired that are not directly transmitted to be displayed on the displayer, and are not directly read and written to the storage device.

The inventor of the present invention recognizes the above shortage should be corrected and special effort has been paid to research this field. The present invention is presented with reasonable design and good effect to resolve the above problems.

SUMMARY OF THE INVENTION

It is a primary object of the present invention to provide a mobile communication device with camera a displayer and a storage device are directly driven by the camera module and the mobile communication module after the image data are acquired.

For achieving the objective stated above, the mobile communication device with camera comprises a mobile communication module, a camera module, a storage unit, a display unit, and a switching module. The mobile communication module has a first transmission interface, the camera module has a second transmission interface; image data processed that are outputted by means of the camera module via the second transmission interface, and next the image data outputted that are received by the mobile communication module via the first transmission interface, and next the image data received that are transmitted to the storage unit to be stored and to the display unit to be displayed. The switching module is installed in the mobile communication module for switching to the camera module operation or the mobile communication module operation.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The above and further advantages of this invention may be better understood by referring to the following description, taken in conjunction with the accompanying drawings, in which.

The drawings will be described further in connection with the following detailed description of the present invention.

DETAILED DESCRIPTION OF THE PREFERRED EMBODIMENTS

Figure 1:
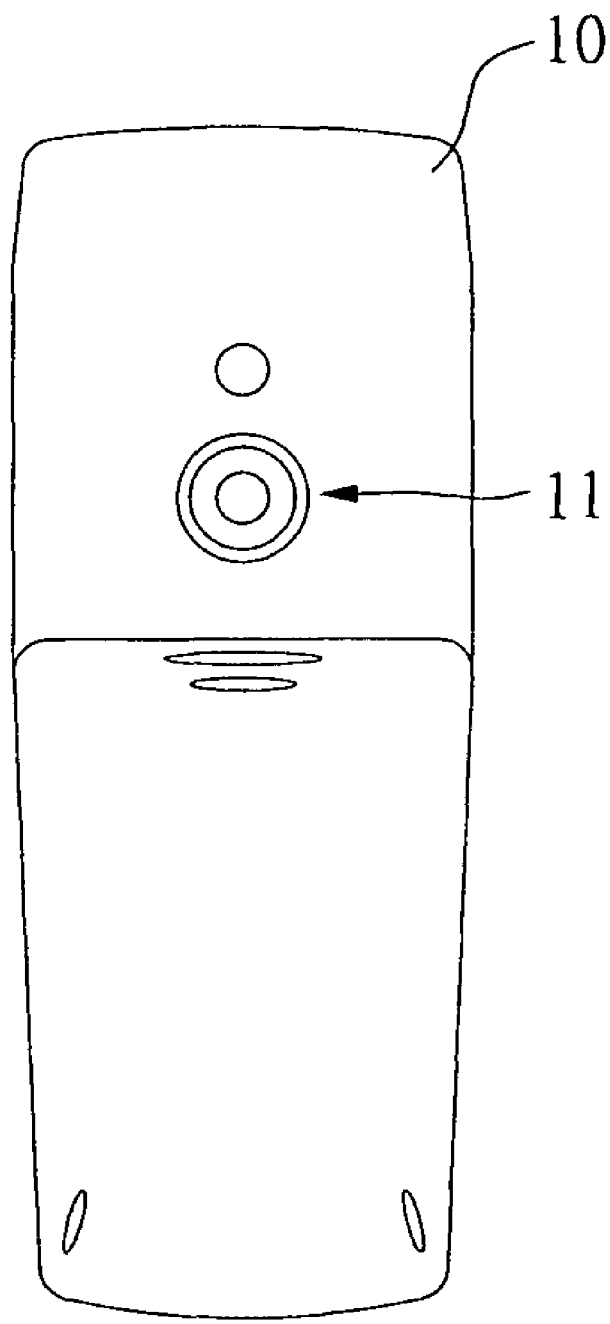
FIG. 1 is a schematic view of a mobile phone with camera of the prior art.
Figure 2:
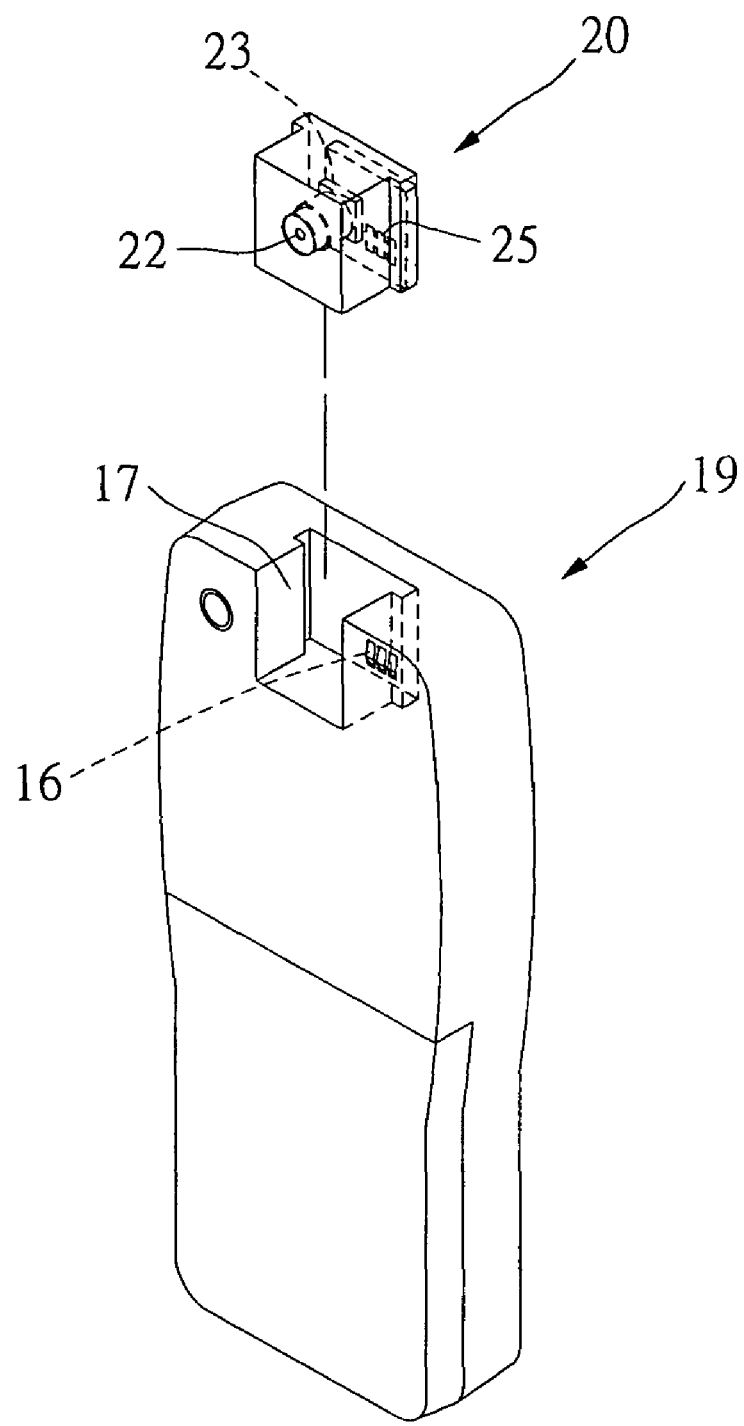
FIG. 2 is a perspective schematic view of a communication device with removable camera of the prior art.
Figure 3:
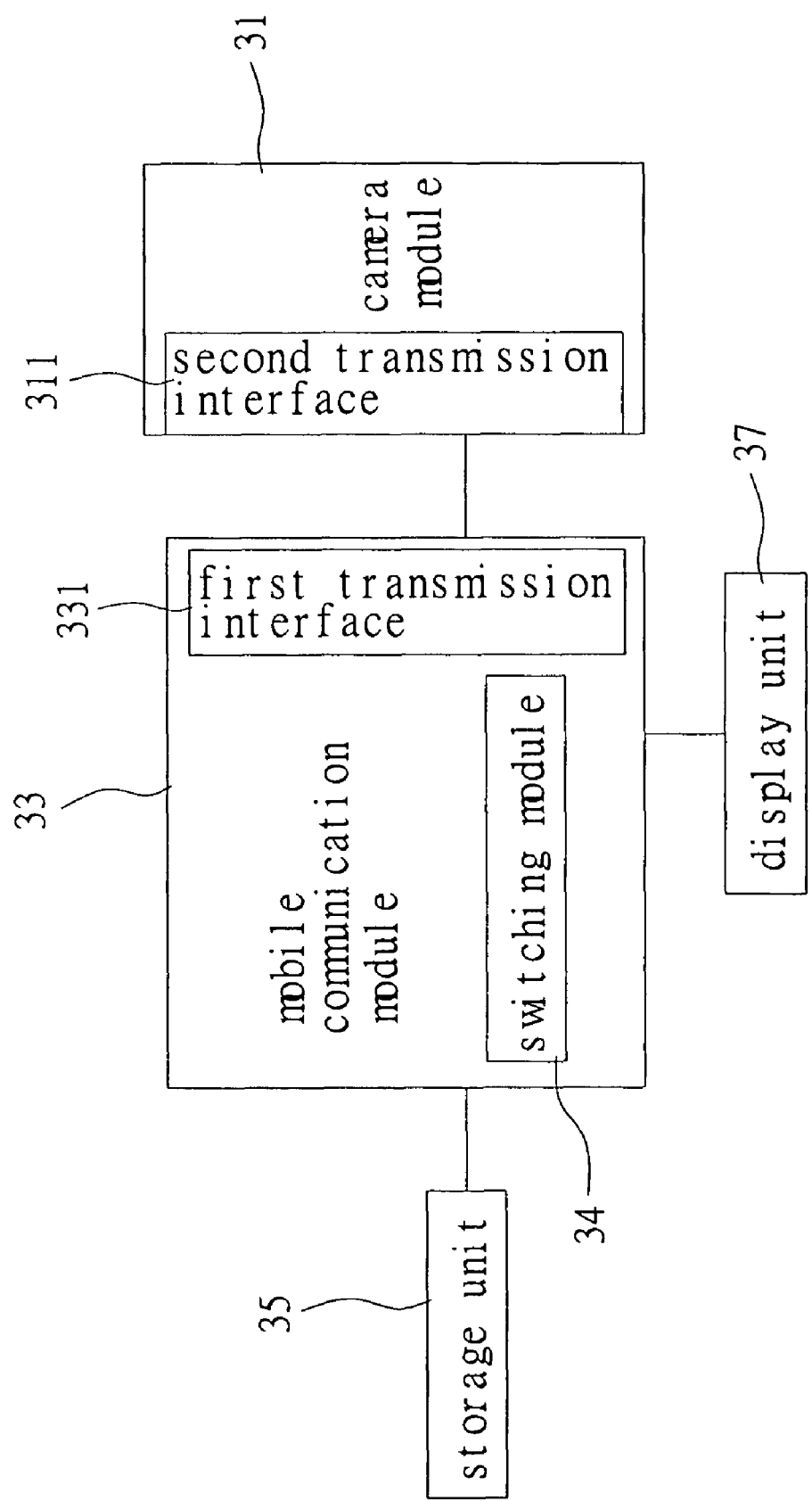
FIG. 3 is a function block diagram of a mobile communication device with camera of the preset invention.

Reference is made to FIG. 3 which is a function block diagram of a mobile communication device with camera of the preset invention. The mobile communication device with camera comprises a camera module 31, a second transmission interface 311, a mobile communication module 33, a first transmission interface 331, a switching module 34, a storage unit 35, and a display unit 37. The second transmission interface 311 is installed in the camera module 31, and the first transmission interface 331 is installed in the mobile communication module 33. The camera module 31 is connected to the first transmission interface 331 by means of the second transmission interface 311 for transmitting image data are processed by the camera module 31 to the mobile communication module 33. The switching module 34 is also installed in the mobile communication module 33 for switching to the camera module 31 operation or the mobile communication module 33 operation: if the mobile communication module 33 is switched, the storage unit 35 and the display unit 37 are controlled and used by means of the mobile communication module 33; and if the camera module 31 is switched, the storage unit 35 and the display unit 37 are controlled and used by means of the camera module 31 via the mobile communication module 33. The original image data acquired that are processed by the camera module 31 and next the image data processed that are outputted as a displayer signal group and a mass storage device signal group; the displayer signal group has been processed by the camera module 31 as the display contents of the display unit 37, and the mass storage device signal group is transmitted by means of the mobile communication module 33 to the storage unit 35 for storing the image data are acquired by the camera module 31. When the camera module 31 is switched, the image data processed that are transmitted to the storage unit 35 to be stored and to the display unit 37 to be displayed by means of the mobile communication module 33 and without being processed by a processor of the mobile communication module 33 (not shown). Furthermore, the above-stated mobile communication module 33 is a mobile phone or personal digital assistant (PDA), the above-stated storage unit 35 is a non-volatile random access memory (NVRAM), a Compact Flash (CF) memory card, a Multi Media Card (MMC) memory card, a Secure Digital (SD) memory card, an XD-picture (XD) memory card, a Memory Stick (MS) memory card, or a Smart Media (SM) memory card, and the switching module 34 is a multiplexer.

Figure 4:
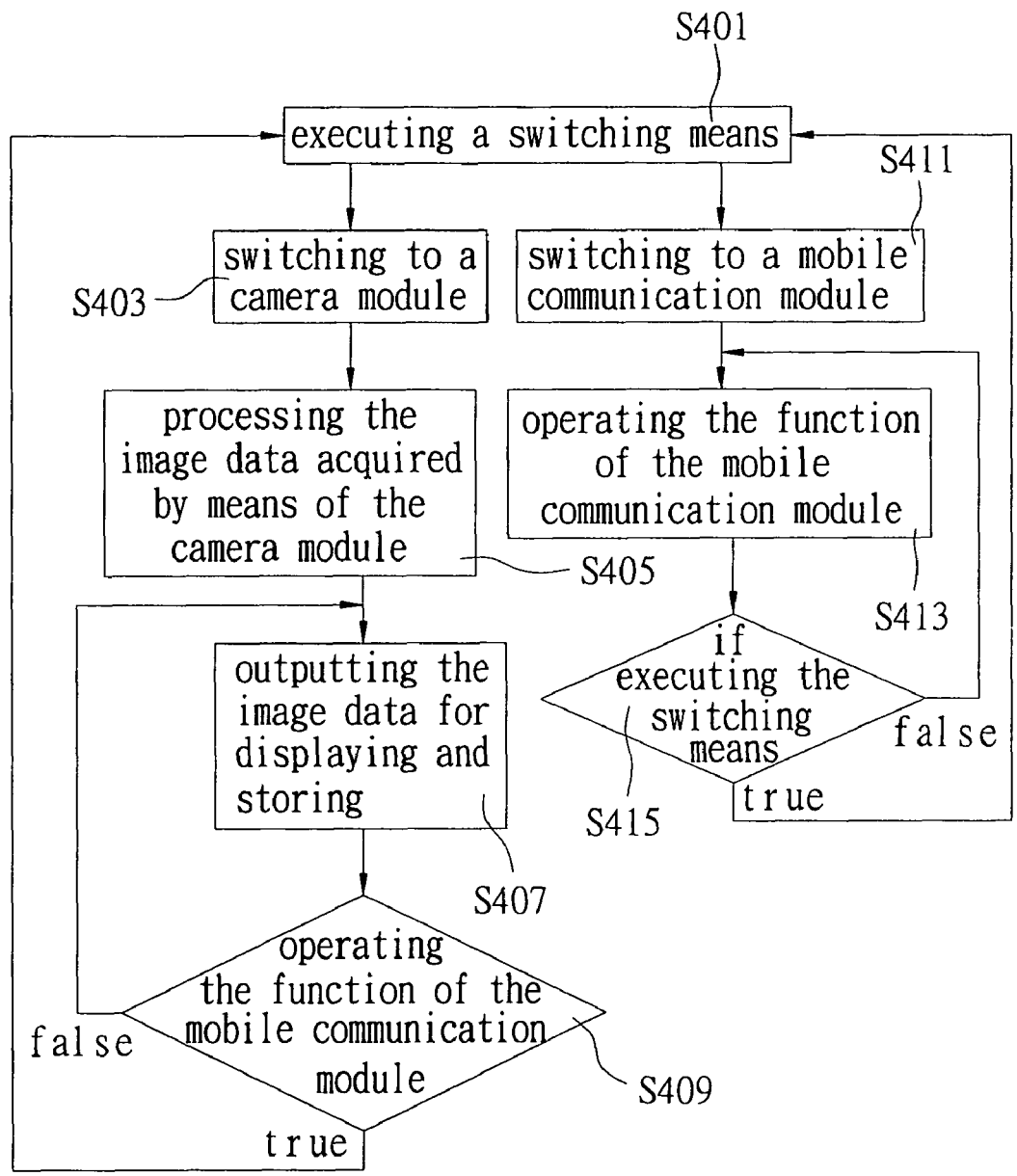
FIG. 4 is an operation flow chart of a mobile communication device with camera of the preset invention.

Reference is made to FIG. 4 which is an operation flow chart of a mobile communication device with camera of the preset invention. First switching a camera module operation or a mobile communication module operation by means of a switching means (as S401 in FIG. 4). Wherein the switching means is to determine whether an operation switch of the camera module is turned on or not: if the operation switch of the camera module is turned on, the camera module operation is switched; and if the operation switch of the camera module is turned off, the mobile communication module operation is switched. Another, the switching means is also that which position is determined for the switch of the camera module and the mobile communication module: if the switch is switched to the position of the camera module, the camera module operation is switched, and if the switch is switched to the position of the mobile communication module, the mobile communication module operation is switched. Besides, the switching means is that a function switch key is determined of switching to the camera module operation or switching to the mobile communication module operation by pressing the function switch key.

If the camera module operation is switched by means of the switching means, the mobile communication device with camera is to be operated in the camera module operation mode (as S403 in FIG. 4), then the image data acquired are processed and outputted by means of the camera module (as S405 in FIG. 4). The image data processed that include the displayer signal group and the mass storage device signal group which can be directly transmitted to the storage unit to be stored and to the display unit to be displayed (as S407 in FIG. 4); in which, the camera module is connected to the mobile communication module via the second transmission interface installed in the camera module and the first transmission interface installed in the mobile communication module for transmitting image data are processed by the camera module to the mobile communication module. And next, determining whether the switching means is executed (as S409 in FIG. 4), if "true" then returns to S401; else then returns to S405 for operating the function of the camera module.

If the mobile communication module operation is switched by means of the switching means, the mobile communication device with camera is to be operated in the mobile communication module operation mode (as S411 in FIG. 4), the storage unit and the display unit are directly controlled and used by means of the mobile communication module (as S413 in FIG. 4). And next, determining whether the switching means is executed (as S415 in FIG. 4), if "true" then returns to S401; else then returns to S413 for operating the function of the mobile communication module.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A mobile communication device with camera, comprising:
   a mobile communication module having a first transmission interface;
   a camera module having a second transmission interface, and the camera module is connected to the first transmission interface by means of the second transmission interface for transmitting data to the mobile communication module;
   a storage unit connected to the mobile communication module for storing data;
   a display unit connected to the mobile communication module for displaying information of the mobile communication module or images acquired and processed by the camera module; and
   a switching module installed in the mobile communication module for switching between the camera module and the mobile communication module, wherein said camera module is operable to acquire an image data, process the image data, and generate display and storage signals from the processed image data;
   wherein when the switching module is switched to the camera module, the storage unit and the display unit are both controlled by the camera module, and the camera module transmits the display signals to the display unit and the storage signals to the storage unit through the mobile communication module without being processed by a processor of the mobile communication module.

2. The mobile communication device with camera as in claim 1, wherein the transmitted display signals include a displayer signal group.

3. The mobile communication device with camera as in claim 2, wherein the displayer signal group has been processed by the camera module for directly displaying the contents of the displayer signal group on the display unit.

4. The mobile communication device with camera as in claim 3, wherein the displayer signal group is transmitted through the mobile communication module to the display unit for displaying an image acquired by the camera module.

5. The mobile communication device with camera as in claim 1, wherein the transmitted storage signals include a mass storage device signal group.

6. The mobile communication device with camera as in claim 5, wherein the mass storage device signal group is transmitted through the mobile communication module to the storage unit for storing an image data acquired by the camera module.

7. The mobile communication device with camera as in claim 1, wherein the switching module is a multiplexer.

8. The mobile communication device with camera as in claim 1, wherein the mobile communication module is a mobile phone or a personal digital assistant (PDA).

9. The mobile communication device with camera as in claim 1, wherein the storage unit is a Compact Flash (CF) memory card, a Multi Media Card (MMC) memory card, a Secure Digital (SD) memory card, an XD-picture (XD) memory card, a Memory Stick (MS) memory card, or a Smart Media (SM) memory card.

10. The mobile communication device with camera as in claim 1, wherein the storage unit is a non-volatile random access memory (NVRAM).

11. An operation method of a mobile communication device with camera, the method comprising the steps of:

switching between a camera module operation mode or a mobile communication module operation mode by a switching module;

determining whether the mobile communication device is in the camera module operation mode or the mobile communication module operation mode;

entering the camera module operation mode responsive to the determination and:
  receiving control of a storage unit and a display unit connected with a mobile communication module;
  acquiring an image data by a camera module;
  processing the image data by the camera module;
  generating display signals and storage signals from the processed image data by the camera module; and,
  transmitting the generated display signals from the camera module to the display unit to be displayed and the storage signals to the storage unit to be stored through said mobile communication module without being processed by a processor of the mobile communication module; and returning control of the storage unit and the display unit to the mobile communication module responsive to the switching module switching to the mobile communication module mode.

12. The operation method as in claim 11, wherein the switching module is used to determine whether an operation switch of the camera module is turned on or not,
  the mobile communication device is switched to the camera module operation mode if the operation switch of the camera module is turned on; and
  the mobile communication device is switched to the mobile communication module operation mode if the operation switch of the camera module is turned off.

13. The operation method as in claim 11, wherein the switching module is used to determine whether a switch is switched to the position indicating the camera module or the mobile communication module,
  the mobile communication device is switched to the camera module operation mode if the switch is switched to the position indicating the camera module, and
  the mobile communication device is switched to the mobile communication module operation mode if the switch is switched to the position indicating the mobile communication module.

14. The operation method as in claim 11, wherein the switching module is a function switch key used for switching between the camera module operation mode and the mobile communication module operation mode by pressing the function switch key.

15. The operation method as in claim 11, wherein the image data is processed to be a displayer signal group for directly displaying on the display unit.

16. The operation method as in claim 15, wherein the displayer signal group is outputted by means of the second transmission interface and is transmitted to the display unit to be displayed via the mobile communication module.

17. The operation method as in claim 16, wherein the mobile communication module is used to receive the displayer signal group by the first transmission interface.

18. The operation method as in claim 11, wherein the image data is processed to be the mass storage device signal group and transmitted to the storage unit to be stored.

19. The operation method as in claim 18, wherein the mass storage device signal group is outputted by means of the second transmission interface and is transmitted to the storage unit to be stored via the mobile communication module.

20. The operation method as in claim 19, wherein the mobile communication module is used to receive the mass storage device signal group by the first transmission interface.

* * * * *